United States Patent
Jeong et al.

(10) Patent No.: US 9,260,576 B2
(45) Date of Patent: Feb. 16, 2016

(54) POLYESTER LAMINATED FILM

(71) Applicant: KOLON INDUSTRIES, INC., Gwacheon-si, Gyeonggi-do (KR)

(72) Inventors: Doo Hwan Jeong, Daegu (KR); Sang Hyun Baek, Gumi-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 14/430,959

(22) PCT Filed: Sep. 26, 2013

(86) PCT No.: PCT/KR2013/008609
§ 371 (c)(1),
(2) Date: Mar. 25, 2015

(87) PCT Pub. No.: WO2014/051340
PCT Pub. Date: Apr. 3, 2014

(65) Prior Publication Data
US 2015/0259490 A1  Sep. 17, 2015

(30) Foreign Application Priority Data

Sep. 28, 2012 (KR) .......................... 10-2012-0108813

(51) Int. Cl.
*C08J 7/04* (2006.01)
*C09D 175/04* (2006.01)
*C08G 18/66* (2006.01)
*C08G 18/73* (2006.01)
*C08G 18/08* (2006.01)
(Continued)

(52) U.S. Cl.
CPC ............. *C08J 7/042* (2013.01); *C08G 18/0819* (2013.01); *C08G 18/12* (2013.01); *C08G 18/3206* (2013.01); *C08G 18/4238* (2013.01); *C08G 18/6644* (2013.01); *C08G 18/73* (2013.01); *C08J 7/047* (2013.01); *C09D 175/04* (2013.01); *C08J 2367/02* (2013.01); *C08J 2433/00* (2013.01); *C08J 2475/04* (2013.01); *C08J 2475/06* (2013.01); *C08J 2483/06* (2013.01); *Y10T 428/24967* (2015.01); *Y10T 428/2848* (2015.01)

(58) Field of Classification Search
CPC .... C08J 7/042; C08J 2367/02; C08J 2433/00; C08J 2483/06; C08J 2475/06
See application file for complete search history.

(56) References Cited

U.S. PATENT DOCUMENTS

| | | | | |
|---|---|---|---|---|
| 6,036,905 | A * | 3/2000 | Park ....................... | C08G 63/20 264/165 |
| 6,103,368 | A * | 8/2000 | Fukuda .................. | B32B 27/36 428/337 |

(Continued)

FOREIGN PATENT DOCUMENTS

| JP | 10-2010-0079587 A | 7/2010 |
|---|---|---|
| JP | 2011-173372 A | 9/2011 |

(Continued)

OTHER PUBLICATIONS

International Searching Authority, International Search Report for PCT/KR2013/008609 dated Dec. 24, 2013.

*Primary Examiner* — Tahseen N Khan
(74) *Attorney, Agent, or Firm* — Sughrue Mion, PLLC

(57) ABSTRACT

Provided is a polyester laminated film having a double-sided heterogeneous coating layer, and more particularly, a polyester laminated film having an excellent antistatic property and post-processability.

12 Claims, 2 Drawing Sheets

(51) Int. Cl.
*C08G 18/12* (2006.01)
*C08G 18/32* (2006.01)
*C08G 18/42* (2006.01)

(56) References Cited

U.S. PATENT DOCUMENTS

| | | | |
|---|---|---|---|
| 6,458,467 B1 | 10/2002 | Mizuno et al. | |
| 2003/0129421 A1* | 7/2003 | Terauchi | C08G 18/283 428/447 |
| 2008/0166658 A1 | 7/2008 | Kim et al. | |
| 2011/0117339 A1* | 5/2011 | Baek | B29C 55/026 428/213 |
| 2012/0302676 A1* | 11/2012 | Oya | C08J 5/18 524/89 |
| 2013/0258479 A1* | 10/2013 | Okafuji | C08F 290/06 359/586 |
| 2015/0013761 A1* | 1/2015 | Kim | H01L 31/049 136/256 |
| 2015/0140330 A1* | 5/2015 | Tanaka | C08J 7/042 428/353 |

FOREIGN PATENT DOCUMENTS

| | | |
|---|---|---|
| KR | 10-2007-0080332 A | 8/2007 |
| KR | 10-2008-0055266 A | 6/2008 |
| KR | 10-2009-0104592 A | 10/2009 |
| KR | 10-2010-0019135 A | 2/2010 |

\* cited by examiner

FIG. 1

| GRADE | SURFACE STATE OF CROSS-CUT PORTION AFTER SEPARATION | |
|---|---|---|
| 5 | NO | AREA OF SEPARATED PORTION : 0% |
| 4 | | AREA OF SEPARATED PORTION : 10% OR LESS |
| 3 | | AREA OF SEPARATED PORTION : 11% ~ 35% |
| 2 | | AREA OF SEPARATED PORTION : 36% ~ 65% |
| 1 | | AREA OF SEPARATED PORTION : 65% OR LESS |
| 0 | | NOT ATTACHED AFTER INITIAL COATING |

POLYESTER LAMINATED FILM

CROSS REFERENCE TO RELATED APPLICATIONS

This application is a National Stage of International Application No. PCT/KR2013/008609 filed Sep. 26, 2013, claiming priority based on Korean Patent Application No. 10-2012-0108813 filed Sep. 28, 2012, the contents of all of which are incorporated herein by reference in their entirety.

TECHNICAL FIELD

The present invention relates to a polyester laminated film having a double-sided heterogeneous coating layer, and more particularly, to a polyester laminated film having an excellent antistatic property and post-processability.

BACKGROUND ART

Generally, polyester, particularly polyethylene terephthalate (hereinafter, referred to as PET) is chemically stable due to its stable structure and has high physical and mechanical strength and excellent heat-resistance, durability, chemical-resistance, and dimensional stability, such that the polyester has been widely used in various medical and industrial fields in addition to a packaging material. Recently, in order to impart various functionalities to a PET film, a method of manufacturing a copolyester film, a method of performing corona-treatment and applying a chemical material on a surface of the film, or the like, may be variously applied. Among them, a method of applying a chemical material to impart a new function to the surface of the film has been widely used.

Examples of the most representative functions of a polyester film of which a primer having a function is applied on a surface as described above may include: first, a printing adhesion function for improving a printing property between ink and the polyester film; second, an adhesion function for imparting an adhesion property with material to be applied in order to manufacture post-processing products having various specific functions, for example, an overhead projector (OHP) film, an exclusive graphic film for a laser or inkjet printer, or a diazo film; third, a heat sealing function for being used in laminating various packages; and fourth, an antistatic function that is essential to protect various graphic films and electronic materials. In addition, a releasing function of facilitating separation between the polyester film and the chemical applied thereonto, a slippery function for improving workability, and the like, are also included therein.

As a technical method of suppressing static electricity from being generated in the film as described above, there are an internal addition method of mixing an organic phosphate salt, or the like, at the time of manufacturing the film, a metal deposition method of depositing a metal compound on a surface, a method of applying a conductive inorganic particle onto the surface, a method of applying an anionic or cationic monomer compound or a polymer compound onto the surface, and the like. Among them, the internal addition method has disadvantages in that excellent physical properties of the film itself may be deteriorated, and it is difficult to uniformly implement an antistatic function. In addition, the method of treating the surface with the conductive polymer (conductive inorganic particles) and metal oxides has been prominent in view of excellent antistatic function, but a manufacturing cost of raw materials is excessively high while a solid content is excessively small, such that this method is restrictively used only for protecting an expensive electronic material. Meanwhile, the method of applying an anionic or cationic antistatic agent has been widely applied due to a relatively excellent antistatic effect and advantages in view of a manufacturing cost such as low manufacturing cost of raw materials, but there are problems such as aging characteristics and transferring to a rear surface caused by movement of the antistatic agent on the surface, thermal instability of a low molecular weight material, blocking, or the like. Therefore, various researches to overcome these problems have been conducted.

For example, as technologies associated with a method of applying a conductive polymer, an antistatic film coated with a primer layer containing the conductive polymer and a polyester-based emulsion as a binder has been disclosed in Korean Patent Laid-Open Publication No. 2008-0055266 (Jun. 19, 2008), and a conductive polymer type composition and film for pollution-proof and antistatic property containing a polyurethane binder resin having a silicone-based functional group has been disclosed in Korean Patent Laid-Open Publication No. 2010-0079587 (Jul. 8, 2010). In addition, as technologies associated with a method of applying an anionic or cationic low molecular weight antistatic agent, a heat shrinkable polyester film applied with a compound containing an anionic antistatic agent and a binder resin and having excellent antistatic performance has been disclosed in Korean Patent Laid-Open Publication No. 2007-0080332 (Aug. 10, 2007), and among polyester films having heterogeneous coating layers on both surfaces, a polyester film composed of an good-adhesive coating layer on one surface and a sulfonic acid-based cationic antistatic layer on the other surface of the base layer has been disclosed in Korean Patent Laid-Open Publication No. 2009-0104592 (Oct. 6, 2009).

A demand for these antistatic films has rapidly increased in accordance with the recent trends toward the growth of a display industry.

However, in the case of films according to the related art, after manufacturing the film, the film is delivered in a state in which the film is wound around a paper tube in a roll form. In this case, an antistatic agent in an antistatic layer may be transferred to a rear surface, which may cause problems in that a printing property is deteriorated at the time of performing a post-processing process such as a printing process, or the like. Therefore, an good-adhesive antistatic film capable of preventing the antistatic agent from being transferred to the rear surface and having excellent adhesive force with other base materials has been demanded.

More specifically, in accordance with the growth of a printing industry in which working is performed in an off-sheet scheme (in which the printing is performed on the sheet one by one in a state in which a plurality of sheets are overlapped with each other) and a market of a phototool material used to manufacture an electronic electric circuit, a demand of the good-adhesive antistatic film for improving adhesive force with a material such as silver halide, or the like, and controlling an electrification property to be generated during the use has also increased, which also increased a demand for the antistatic film.

RELATED ART DOCUMENT

Patent Document

Korean Patent Laid-Open Publication No. 2008-0055266 (Jun. 19, 2008)
Korean Patent Laid-Open Publication No. 2010-0079587 (Jul. 8, 2010)
Korean Patent Laid-Open Publication No. 2007-0080332 (Aug. 10, 2007)

Korean Patent Laid-Open Publication No. 2009-0104592 (Oct. 6, 2009)

DISCLOSURE OF INVENTION

Technical Problem

An object of the present invention is to provide a polyester laminated film having excellent antistatic property and adhesive property with other base materials. More specifically, the object of the present invention is to provide a polyester laminated film having an excellent good-adhesive property by controlling an amount of antistatic agent transferred to an good-adhesive coating layer on a rear surface regardless of transferring of the antistatic agent contained in an antistatic coating layer to the good-adhesive coating layer.

Solution to Problem

The present invention relates to an good-adhesive antistatic film having antistatic performance so as to solve problems such as product defects generated when external foreign materials such as surface dust, or the like, are introduced due to an electrification phenomenon generated by friction, explosion or fire that will be generated under the condition at which an inflammable organic solvent is used, or the like, and simultaneously having adhesion performance between an good-adhesive coating layer coated on a base film and a material applied thereon so as to solve a separation problem of the material applied onto the polyester base film.

In one general aspect, there is provided a polyester laminated film including: a polyester base film; an good-adhesive coating layer formed on one surface of the base film; and an antistatic coating layer formed on the other surface of the base film, wherein after back-side transfer is performed on the antistatic coating layer and the good-adhesive coating layer at 40° C. for 3 days (40° C./3 day) under a load of 50 kgf/cm$^2$, surface resistance A of the good-adhesive coating layer and surface resistance B of the antistatic coating layer satisfy the following Equation 1.

$$1 \times 10^4 \leq A - B \quad \text{[Equation 1]}$$

(In Equation, A indicates the surface resistance ($\Omega/\square$) of the good-adhesive coating layer after back-side transfer, and B indicates the surface resistance ($\Omega/\square$) of the antistatic coating layer after back-side transfer.)

The surface resistance of the good-adhesive coating layer before back-side transfer may be $1 \times 10^{13}$ to $1 \times 10^{16} \Omega/\square$.

The surface resistance of the antistatic coating layer before back-side transfer may be $1 \times 10^9$ to $1 \times 10^{10} \Omega/\square$.

The good-adhesive coating layer may be formed by applying a polyurethane coating composition containing a water dispersion polyurethane resin containing isocyanate terminal groups partially or entirely blocked by an inorganic acid salt.

The polyurethane coating composition may contain 5 to 10 weight % of a water dispersion polyurethane binder containing the water dispersion polyurethane resin and water and having a solid content of 10 to 30 weight %, 0.1 to 0.5 weight % of silicone-based wetting agent, 0.1 to 0.5 weight % of colloidal silica particle, and residual water.

The water dispersion polyurethane resin may be composed of 10 to 75 weight % of a linear polymer and 25 to 90 weight % of a branched polymer.

The water dispersion polyurethane resin may be prepared by reacting 39 to 45 weight % of polyol, 0.3 to 1.2 weight % of trimethylol propane, and 50 to 57 weight % of an isocyanate compound to each other to prepare a pre-polymer having an isocyanate terminal group and again reacting the pre-polymer with 3 to 4 weight % of an inorganic acid salt to block the isocyanate terminal group with ionic groups.

The water dispersion polyurethane resin may have a weight average molecular weight of 10,000 to 20,000.

The antistatic coating layer may be formed by applying an antistatic coating composition containing a binder resin and a quaternary ammonium sulfonate-based compound.

The antistatic coating layer may contain the quaternary ammonium sulfonate-based compound at a content of 30 to 300 parts by weight based on 100 parts by weight of the binder resin and has the entire solid content of 5 to 10 weight %.

The binder resin may be an acrylic resin having a glass transition temperature of 50 to 80° C.

The base film may have a thickness of 100 to 250 μm, the good-adhesive coating layer may have a dried coating thickness of 50 to 100 nm, and the antistatic coating layer may have a dried coating thickness of 0.03 to 0.1 μm.

Advantageous Effects of Invention

The polyester film according to the present invention has high transparency and light transmittance and excellent adhesive property with a post-processing coating material and antistatic property, such that the polyester film may be variously applied throughout various industries including an electronic material field.

BRIEF DESCRIPTION OF DRAWINGS

FIG. 1 is a standard for distinguishing a grade at the time of measuring adhesive force.

MODE FOR THE INVENTION

Figure 2:
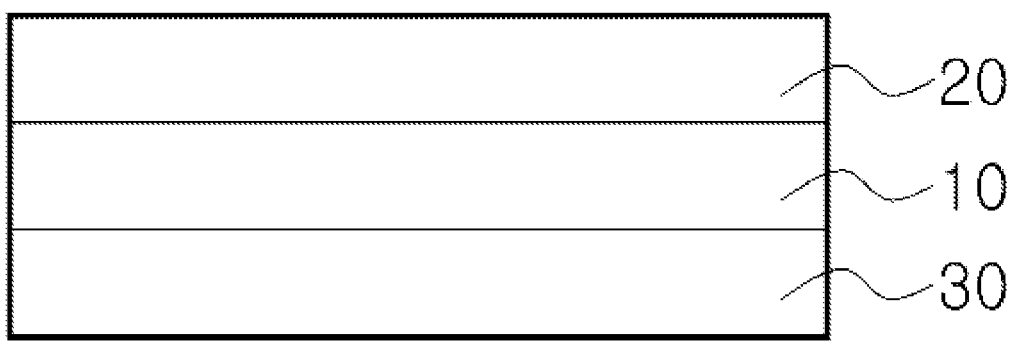
FIG. 2 is a cross-sectional view showing a polyester laminated film according to an exemplary embodiment of the present invention.

Hereinafter, an aspect of the present invention will be described in detail with reference to the accompanying drawings.

In the aspect of the present invention, as shown in FIG. 2, the present invention relates to a polyester laminated film including a polyester base film 10, an good-adhesive coating layer 20 formed on one surface of the base film, and an antistatic coating layer 30 formed on the other surface of the base film, wherein after back-side transfer is performed on the antistatic coating layer and the good-adhesive coating layer at 40° C. for 3 days (40° C./3 day) under a load of 50 kgf/cm$^2$, surface resistance A of the good-adhesive coating layer and surface resistance B of the antistatic coating layer satisfy the following Equation 1.

$$1 \times 10^4 \leq A - B \quad \text{[Equation 1]}$$

(In Equation, A indicates the surface resistance ($\Omega/\square$) of the good-adhesive coating layer after back-side transfer, and B indicates the surface resistance ($\Omega/\square$) of the antistatic coating layer after back-side transfer.)

In the present invention, the term "back-side transfer" means that the antistatic agent of the antistatic coating layer is transferred to the good-adhesive coating layer by applying a load of 50 kgf/cm$^2$ at 40° C./3 days after the good-adhesive coating layer 20 and an antistatic coating layer 30 of the polyester laminated film are laminated so as to face each other.

In the aspect of the present invention, it may be confirmed that in the case in which a difference between the surface resistance A of the good-adhesive coating layer and surface resistance B of the antistatic coating layer is $1 \times 10^4$ or more, more specifically, is in a range of $1 \times 10^4$ to $1 \times 10^8$ after performing the back-side transfer on the good-adhesive coating layer and the antistatic coating layer at 40° C./3 day under the load of 50 kgf/cm², the back-side transfer is not performed. Therefore, the good-adhesive coating layer may have an excellent printing property within the above-mentioned range. In addition, the polyester laminated film has advantages such as excellent light transmittance and antistatic performance, an good-adhesive property, and excellent anti-blocking performance.

That is, it may be confirmed that in the case in which the difference between the surface resistance A of the good-adhesive coating layer and surface resistance B of the antistatic coating layer is less than $1 \times 10^4$ after back-side transfer, the antistatic agent is transferred to the rear surface. In the case in which the film is delivered in a shape in which the film is wound around a paper tube in a roll-to-roll type after manufacturing the film, the antistatic agent of the antistatic coating layer may be transferred to the good-adhesive layer, which may deteriorate physical properties of the good-adhesive coating layer, and accordingly, in the case in which a user finally using the film performs the printing on the good-adhesive coating layer, a defect may be generated.

In the aspect of the present invention, as the polyester base film 10, a polyester film, more specifically, a polyethylene terephthalate or polyethylene naphthalate film may be preferably used in view of excellent light transmittance, and the polyester base film may contain an additive or a particle. Preferably, the polyester base film having a refractive index of 1.63 to 1.65 may be used. In order to satisfy this refractive index range, particles may be further added. As the particle, inorganic particles such as calcium carbonate particles, calcium phosphate particles, silica particles, alumina particles, barium sulfate particles, calcium hydroxide particles, or the like, or organic particles such as cross-linked polymer particles, or the like, may be added. As this polyethylene terephthalate film, a stretched polyethylene terephthalate film may be preferably used, and this film may be a uni-axially stretched or bi-axially stretched. A thickness of the base film may be 100 to 250 μm, but is not limited thereto. In the case in which the thickness is less than 100 μm, mechanical properties and heat resistance may be insufficient, and in the case in which the thickness is more than 250 μm, it may be difficult to be stably used during a post-processing process.

In the aspect of the present invention, the good-adhesive coating layer 20 may have surface resistance of $1 \times 10^{13}$ to $1 \times 10^{16} \Omega/\square$ before back-side transfer.

In order to satisfy the above-mentioned property, the good-adhesive coating layer according to the present invention may be formed by applying a polyurethane coating composition containing a water dispersion polyurethane resin containing isocyanate terminal groups partially or entirely blocked by an inorganic acid salt.

The water dispersion polyurethane resin contains a branched polymer having at least three isocyanate functional groups, which are terminal groups, wherein the isocyanate groups are partially or entirely blocked by an inorganic acid salt. More specifically, the water dispersion polyurethane resin contains a branched polymer blocked by an inorganic salt such as sulfate and a linear polymer having two isocyanate functional groups partially or entirely blocked by an inorganic acid salt, more specifically, an inorganic salt such as sulfate.

The water dispersion polyurethane resin may be configured of 10 to 75 weight % of the linear polymer and 25 to 90 weight % of the branched polymer. A coating layer having an excellent adhesive property under high temperature and high humidity conditions may be formed within the above-mentioned range. In the present invention, the branched polymer means a resin having at least three isocyanate functional groups.

In the aspect of the present invention, the water dispersion polyurethane resin prepared by reacting 39 to 45 weight % of polyol, 0.3 to 1.2 weight % trimethylol propane, and 50 to 57 weight % of an isocyanate compound to each other to prepare a pre-polymer having an isocyanate terminal group and again reacting the pre-polymer with 3 to 4 weight % of an inorganic acid salt to block the isocyanate terminal group with ionic groups may be preferably used. In addition, when a weight average molecular weight of the water dispersion polyurethane resin is in a range of 10,000 to 20,000, gelation may not occur, water dispersion may be performed, and the coating layer having excellent physical properties at a high temperature and high humidity may be obtained.

The weight average molecular weight may be measured using a GPC-multi angle light scattering (MALS) system (Wyatt Co.), and a configuration of MALS system is as follows.

Configuration of the MALS system
GPC: Water 1525 Binary HPLC Pump
RI detector: Optilab rex
MALS: Wyatt Dawn 8+
Column: PLgel 5 μm Mixed-C (7.5 mmΦ×300 mm)×2 (Polymer Laboratories)
Mobile phase: DMF (50 mM LiCl)
Flow rate: 0.5 mL/min
Temperature: 50° C.
Injection volume: 0.5%, 500 μl As the polyol, polyester based polyol or polyether based polyol may be used, and polyester based polyol may be preferably used. Polyester based polyol may be polyol prepared by reacting carboxylic acid, sebacic acid, or acid anhydride with polyhydric alcohol. A kind of polyol is not limited, and polyester polyol having a weight average molecular weight of 600 to 3000 may be preferably used. A content of the polyol may be preferably 39 to 45 weight %. In the case in which the content is lower than 39 weight %, a molecular weight becomes small, such that a primer layer becomes excessively hard, and it may be difficult to be stretched, such that coating appearance may not be excellent. In the case in which the content is higher than 45 weight %, an in-line coating (ILC) layer becomes excessively soft, such that a blocking property may be deteriorated.

Trimethylol propane is used to prepare the pre-polymer having three functional groups, and a content of the used trimethylol propane may be 0.3 to 1.2 weight %. In the case in which the content is lower than 0.3 weight %, cross-link density may be reduced and an anti-blocking property may be reduced, and in the case in which the content is higher than 1.2 weight %, the cross-link density is excessively high, which deteriorates a stretching property, such that coating appearance may not be excellent, and adhesive force may be deteriorated.

The isocyanate compound is not limited, but hexamethylene diisocyanate may be preferably used. When a content of the isocyanate compound is 50 to 57 weight %, the pre-polymer having three functional groups may be prepared.

As the inorganic acid salt, sodium hydrogen sulfate may be preferably used, and a content thereof may be 3 to 4 weight %.

In the aspect of the present invention, the polyurethane coating composition contains 5 to 10 weight % of a water dispersion polyurethane binder containing the water dispersion polyurethane resin and water and having a solid content of 10 to 30 weight %, 0.1 to 0.5 weight % of silicon based wetting agent, 0.1 to 0.5 weight % of colloidal silica particle, and residual water. A content of the silicon based wetting agent may be 0.1 to 0.5 weight %, and a content of the colloidal silica particle may be 0.1 to 0.5 weight %. In addition, an average particle size of the colloidal silica particle may be 50 to 1000 nm.

In the aspect of the present invention, in view of adjusting a coating thickness, it may be preferable that the water dispersion polyurethane binder contains the water dispersion polyurethane resin and water so as to have a solid content of 10 to 30 weight % and a content of the water dispersion polyurethane binder is 5 to 10 weight % of the entire polyurethane coating composition. When the content is lower than 5 weight %, a coating property may be excellent but it may be difficult to implement adhesion, and when the content is higher than 10 weight %, the adhesion may be excellent but it may be difficult to implement coating appearance and transparency.

In the present invention, a dried coating thickness of the good-adhesive coating layer may be preferably 50 to 100 nm. As a coating method, an in-line coating method of applying the composition on the surface during a stretching process of the polyester film may be used, and an off-line coating method after manufacturing the film may be also used. Both of the methods may be used. Preferably, since in the in-line coating method, the applying and film forming is simultaneously performed, manufacturing cost may be reduced, and a thickness of the coating layer may be changed by stretching magnification, the in-line coating method may be preferable.

In the aspect of the present invention, the antistatic coating layer 30 may have surface resistance of $1\times10^9$ to $1\times10^{10}\Omega/\square$ before back-side transfer.

In order to satisfy the above-mentioned property, the antistatic coating layer may be formed by applying an antistatic coating composition containing a binder resin and a quaternary ammonium sulfonate-based compound.

In the aspect of the present invention, the antistatic coating composition may contain the quaternary ammonium sulfonate-based compound at a content of 30 to 300 parts by weight based on 100 parts by weight of the binder resin and have the entire solid content of 5 to 10 weight %. In the case in which the content of the quaternary ammonium sulfonate-based compound is less than 30 parts by weight, the antistatic performance may be deteriorated, and in the case in which the content is more than 300 parts by weight, the antistatic agent is migrated to the surface, thereby making it possible to generate a blooming phenomenon.

The binder resin may be an acrylic resin having a glass transition temperature of 50 to 80° C. As the binder resin, the acrylic resin may be advantageous in that mechanical properties may be excellent, and a refractive index of the antistatic layer may be easily controlled at 1.4 to 1.5. As the acrylic resin, an acrylic resin prepared by polymerizing any one selected from a group consisting of acrylic acid, methacrylic acid, methyl acrylate, ethyl acrylate, n-acrylate, ethyl methacrylate, acrylamide, butyl acrylate, glycidyl methacrylate, and the like, may be used. In addition, the blocking phenomenon may be reduced without using the silica particle used as the anti-blocking agent by applying an acrylic resin having a glass transition temperature ($T_g$) of 50 to 80° C. as the binder resin.

As a specific example of the quaternary ammonium sulfonate-based compound, any one selected from cyclic N-alkyl ammonium sulfonates such as (C20-C40)tetraalkyl ammonium sulfonate, (C20-C40)trialkyl benzyl ammonium sulfonate), imidazole, or the like, may be selected and used. Transfer performance to the rear surface may be improved by using the antistatic agent, which is a cationic antistatic agent, basically having excellent thermal stability and a weight average molecular weight of 100,000 to 200,000, as compared to the existing lower molecular weight antistatic agent. That is, after back-side transfer, the difference in the surface resistance between two coating layers may be $10^4\Omega/\square$ or more. Nevertheless, basic antistatic performance may be secured at $10^9 \sim 10^{10}\Omega/\square$ based on the surface resistance.

In the aspect of the present invention, the antistatic coating layer has a dried coating thickness of 0.03 to 0.1 μm. As a coating method, an in-line coating method of applying the composition on the surface during a stretching process of the polyester film may be used, and an off-line coating method after manufacturing the film may be also used. Both methods may be used. Preferably, since in the in-line coating method, the applying and film forming is simultaneously performed, manufacturing cost may be reduced, and a thickness of the coating layer may be changed by stretching magnification, the in-line coating method may be preferable.

Hereinafter, a manufacturing method of a polyester laminated film according to the embodiment of the present invention will be described in detail, but is not limited thereto.

A polyester laminated film having a double-sided heterogeneous coating layer according to the present invention may be manufactured by melt-extruding a polyester raw material resin to manufacture an amorphous polyester sheet, uni-axially stretching a machine direction equal to a moving direction of the sheet, applying an good-adhesive coating solution onto one surface of the uni-axially stretched polyester sheet applying an antistatic coating solution onto the other surface thereof, preheating the sheet while drying the coating solutions, stretching the preheated and dried sheet in a transverse direction, and then heat-treating the stretched sheet.

In more detail, first, the polyester raw material resin was sufficiently vacuum-dried and melt-extruded through an extruder, and the hot melt polyester resin is formed in a sheet form in a rotary cooling roll through a die. In this case, an unstretched polyester sheet may be obtained by closely contacting the polymer with the cooling roll by an electrostatic application method. In this case, a master batch may be polymerized by mixing the silica particle with the polyester raw material resin or injecting the silica particle in a polymerization step of the polyester and mixed with a base material to which the silica particle is not added to thereby be used. The unstretched polyester sheet obtained as described above is stretched 2.5 to 4.0 times in the machine direction while passing through a roll heated to 80 to 110° C., thereby obtaining the uni-axially stretched polyester film. After the good-adhesive coating solution is applied onto one surface of the uni-axially stretched polyester film, and the antistatic coating solution onto the other surface thereof, the stretched sheet is preheated and dried at 100 to 140° C. and then stretched 2.5 to 4.0 times again in the transverse direction, followed by thermal treating the stretched polyester film at 200 to 235° C. in a tenter thermal treating zone. Then, the film is relaxed by 0.01 to 10% in a cooling zone in the machine or transverse direction to thereby be heat-set at 190° C. or less, thereby manufacturing the bi-axially stretched polyester film having heterogeneous coating layers on both sides thereof.

As a coating method of the good-adhesive coating layer coating solution and the antistatic coating solution, a method known in the art such as a gravure coating method, a kiss coating method, a wire bar coating method, a spray coating method, an air knife coating method, or the like, may be used alone or combined with each other to thereby be used.

Hereinafter, the present invention will be described in detail with reference to the following Examples. However, the following Examples are to illustrate the present invention, and the scope of the present invention is not limited to the following Examples.

Physical properties required in the polyester laminated film according to the present invention and specific methods for measuring these physical properties are as follows.

(1) Antistatic Property

Surface resistance was measured using an insulation resistance meter (Hiresta-UP, Mitsubishi Chemical, Japan). Measurement was performed under conditions of 25° C., relative humidity of 60%, and applied voltage of 500V. The smaller the surface resistance value, the more excellent the antistatic property.

(2) Total Transmittance

Light transmittance of the film was measured in a visible ray region using a haze meter (model name: 300A, Nippon Denshoku Corp.).

3) Measurement of Adhesive Force (ASTM B905)

After manufacturing polyester films according to Examples and Comparative Examples, a hard coating treatment was performed on one surface of the film coated with the polyurethane coating composition, and then adhesive force between a hard coating layer and an good-adhesive layer was measured at room temperature. After hot-water treatment at a high temperature (100° C., 10 min), adhesive force between the hard coating layer and the good-adhesive layer was measured.

As shown in FIG. 1, the case in which 100% of the film remains in a lattice, the case in which 90 to 95% thereof remains, the case in which 65 to 85% thereof remains, the case in which 35 to 60% thereof remains, the case in which 35% or less thereof remains, and the case in which the hard coating layer is not adhered, were evaluated as grade 5, grade 4, grade 3, grade 2, grade 1, and grade 0, respectively.

(4) Blocking Property

Two sheets of the polyester films manufactured in Examples and Comparative Examples were overlapped with each other and pressed using a heat gradient tester (Toyosk, Japan) under pressure of 0.4 MPa at 50° C. for 3 days. Then, whether or not a blocking property between the films was present was observed by the naked eyes and evaluated as follows.

Excellent (O): There was no blocking property.

Poor (X): There was blocking property.

(5) Transfer Performance 5 sheets of the polyester films manufactured in Examples and Comparative Examples were laminated and maintained using a press under pressure of 50 kgf/cm² at 40° C. for 3 days. Thereafter, whether or not the antistatic agent of the antistatic coating layer was transferred to the good-adhesive coating layer was evaluated by measuring surface resistance using an insulation resistance meter (Hiresta-UP, Mitsubishi Chemical, Japan). Measurement was performed under conditions of 25° C., relative humidity of 60%, and applied voltage of 500V.

Excellent (O): There was no transfer problem (surface resistance of good-adhesive coating layer surface resistance of antistatic coating layer was $10^4 \Omega/\square$ or more)

Poor (X): There was a transfer problem (surface resistance of good-adhesive coating layer surface resistance of antistatic coating layer was less than $10^4 \Omega/\square$)

Example 1

1) Preparation of Water Dispersion Polyurethane Binder

Water dispersion polyurethane theoretically having 50 weight % of branched polymer was prepared.

After a pre-polymer having isocyanate functional groups as the terminal group was prepared by reacting 40 weight % of polyethyleneadipate diol, 0.6 weight % of trimethylol propane, and 55.9 weight % of hexamethylene diisocyanate with each other, polyurethane having ionic groups and weight average molecular weight of 14,400 was prepared by reacting isocyanate, which is a terminal functional group of the pre-polymer, with 3.5 weight % of sodium hydrogen sulfate as an ionic group. The water dispersion polyurethane binder having a solid content of 20 weight % was prepared by dispersing 20 weight % of the polyurethane prepared as described above in 80 weight % of water.

2) Preparation of Polyurethane Coating Solution 1

5 weight % of the water dispersion polyurethane binder prepared above, 0.3 weight % of silicone-based wetting agent (Dow Corning Corp. polyester-siloxane copolymer), and 0.3 weight % of colloidal silica particle having an average particle size of 140 nm were added to water and stirred for 2 hours, thereby preparing a polyurethane coating composition 1.

3) Preparation of Antistatic Coating Solution 1

2.0 weight % of acrylic binder having a $T_g$ of 60° C., 2.0 weight % of quaternary ammonium sulfonate-based antistatic agent (C-077P-2, Takemoto Corp., molecular weight: 100,000), 0.1 weight % of silicone-based wetting agent (Dow Corning Corp. polyester-siloxane copolymer), and 0.1 weight % of melamine-based hardening agent (C-K01, Takemoto Corp.) were added to water and stirred for 3 hours, thereby preparing an antistatic coating solution 1 having the entire solid content of 6 weight %.

4) Manufacturing of Polyester Film

A dehydrated polyethylene terephthalate chip was put into an extruder, melt-extruded, and then rapidly cooled and hardened using a casting drum having a surface temperature of 20° C., thereby manufacturing a polyethylene terephthalate sheet having a thickness of 2000 μm. The manufactured polyethylene terephthalate sheet was stretched 3.5 times in a machine direction (MD) at 80° C. and cooled to room temperature. Next, after the polyurethane coating solution 1 was coated on one surface of the sheet by a bar coating method and the antistatic coating solution 1 was coated on the other surface by the bar coating method, the coated sheet was stretched 3.5 times in a transverse direction (TD) through preheating and drying while raising the temperature to 110~150° C. by 1° C. per second. Then, heat-treatment was performed in a 5-stage tenter at 230° C., the heat-treated film was relaxed by 10% in the machine and transverse directions at 200° C. to be heat-set, thereby manufacturing a bi-axially stretched film coated on both surfaces thereof and having a thickness of 188 μm. A dried coating thickness of the polyurethane coating layer was 80 nm, and a dried coating thickness of the antistatic coating layer was 30 nm.

Physical properties of the polyester film obtained as described above were shown in the following Table 1.

Example 2

1) Preparation of Antistatic Coating Solution 2

4.0 weight % of acrylic binder having a $T_g$ of 60° C., 4.0 weight % of quaternary ammonium sulfonate-based antistatic agent (C-077P-2, Takemoto Corp., molecular weight: 100, 000), 0.1 weight % of silicone-based wetting agent (Dow Corning Corp. polyester-siloxane copolymer), and 0.2 weight % of melamine-based hardening agent (C-K01, Takemoto Corp.) were added to water and stirred for 3 hours, thereby preparing an antistatic coating solution 2 having the entire solid content of 6 weight %.

2) Manufacturing of Polyester Film

A dehydrated polyethylene terephthalate chip was put into an extruder, melt-extruded, and then rapidly cooled and hardened using a casting drum having a surface temperature of 20° C., thereby manufacturing a polyethylene terephthalate sheet having a thickness of 2000 μm. The manufactured polyethylene terephthalate sheet was stretched 3.5 times in a machine direction (MD) at 80° C. and cooled to room temperature. Next, after the polyurethane coating solution 1 prepared in Example 1 was coated on one surface of the sheet by a bar coating method and the antistatic coating solution 2 was coated on the other surface by the bar coating method, the coated sheet was stretched 3.5 times in a transverse direction (TD) through preheating and drying while raising the temperature to 110-150° C. by 1° C. per second. Then, heat-treatment was performed in a 5-stage tenter at 230° C., the heat-treated film was relaxed by 10% in the machine and transverse directions at 200° C. to be heat-set, thereby manufacturing a bi-axially stretched film coated on both surfaces thereof and having a thickness of 188 μm. A dried coating thickness of the polyurethane coating layer was 80 nm, and a dried coating thickness of the antistatic coating layer was 60 nm.

Physical properties of the polyester film obtained as described above were shown in the following Table 1.

Example 3

1) Preparation of Antistatic Coating Solution 3

6.0 weight % of acrylic binder having a $T_g$ of 60° C., 6.0 weight % of quaternary ammonium sulfonate-based antistatic agent (C-077P-2, Takemoto Corp., molecular weight: 100, 000), 0.1 weight % of silicone-based wetting agent (Dow Corning Corp. polyester-siloxane copolymer), and 0.3 weight % of melamine-based hardening agent (C-K01, Takemoto Corp.) were added to water and stirred for 3 hours, thereby preparing an antistatic coating solution 3 having the entire solid content of 6 weight %.

2) Manufacturing of Polyester Film

A dehydrated polyethylene terephthalate chip was put into an extruder, melt-extruded, and then rapidly cooled and hardened using a casting drum having a surface temperature of 20° C., thereby manufacturing a polyethylene terephthalate sheet having a thickness of 2000 μm. The manufactured polyethylene terephthalate sheet was stretched 3.5 times in a machine direction (MD) at 80° C. and cooled to room temperature. Next, after the polyurethane coating solution 1 prepared in Example 1 was coated on one surface of the sheet by a bar coating method and the antistatic coating solution 3 was coated on the other surface by the bar coating method, the coated sheet was stretched 3.5 times in a transverse direction (TD) through preheating and drying while raising the temperature to 110-150° C. by 1° C. per second. Then, heat-treatment was performed in a 5-stage tenter at 230° C., the heat-treated film was relaxed by 10% in the machine and transverse directions at 200° C. to be heat-set, thereby manufacturing a bi-axially stretched film coated on both surfaces thereof and having a thickness of 188 μm. A dried coating thickness of the polyurethane coating layer was 80 nm, and a dried coating thickness of the antistatic coating layer was 90 nm.

Physical properties of the polyester film obtained as described above were shown in the following Table 1.

Comparative Example 1

1) Preparation of Antistatic Coating Solution 4

4.0 weight % of acrylic binder having a $T_g$ of 60° C., 4.0 weight % of quaternary ammonium sulfonate-based antistatic agent (ES-7205, Morechem Corp., molecular weight: 3,000), and 0.1 weight % of silicone-based wetting agent (Dow Corning Corp. polyester-siloxane copolymer) were added to water and stirred for 3 hours, thereby preparing an antistatic coating solution 4 having the entire solid content of 6 weight %.

2) Manufacturing of Polyester Film

A dehydrated polyethylene terephthalate chip was put into an extruder, melt-extruded, and then rapidly cooled and hardened using a casting drum having a surface temperature of 20° C., thereby manufacturing a polyethylene terephthalate sheet having a thickness of 2000 μm. The manufactured polyethylene terephthalate sheet was stretched 3.5 times in a machine direction (MD) at 80° C. and cooled to room temperature. Next, after the polyurethane coating solution 1 prepared in Example 1 was coated on one surface of the sheet by a bar coating method and the antistatic coating solution 4 was coated on the other surface by the bar coating method, the coated sheet was stretched 3.5 times in a transverse direction (TD) through preheating and drying while raising the temperature to 110~150° C. by 1° C. per second. Then, heat-treatment was performed in a 5-stage tenter at 230° C., the heat-treated film was relaxed by 10% in the machine and transverse directions at 200° C. to be heat-set, thereby manufacturing a bi-axially stretched film coated on both surfaces thereof and having a thickness of 188 μm. A dried coating thickness of the polyurethane coating layer was 80 nm, and a dried coating thickness of the antistatic coating layer was 60 nm.

Physical properties of the polyester film obtained as described above were shown in the following Table 1.

Comparative Example 2

1) Preparation of Antistatic Coating Solution 5

4.0 weight % of acrylic binder having a $T_g$ of 60° C., 4.0 weight % of phosphate-based anionic (counter ion: Na$^+$) antistatic agent (ES-7500, Morechem Corp., molecular weight: 2,000), and 0.1 weight % of silicone-based wetting agent (Dow Corning Corp. polyester-siloxane copolymer) were added to water and stirred for 3 hours, thereby preparing an antistatic coating solution 5 having the entire solid content of 6 weight %.

2) Manufacturing of Polyester Film

A dehydrated polyethylene terephthalate chip was put into an extruder, melt-extruded, and then rapidly cooled and hardened using a casting drum having a surface temperature of 20° C., thereby manufacturing a polyethylene terephthalate sheet having a thickness of 2000 μm. The manufactured polyethylene terephthalate sheet was stretched 3.5 times in a machine direction (MD) at 80° C. and cooled to room temperature. Next, after the polyurethane coating solution 1 prepared in Example 1 was coated on one surface of the sheet by a bar coating method and the antistatic coating solution 5 was coated on the other surface by the bar coating method, the coated sheet was stretched 3.5 times in a transverse direction (TD) through preheating and drying while raising the temperature to 110~150° C. by 1° C. per second. Then, heat-treatment was performed in a 5-stage tenter at 230° C., the heat-treated film was relaxed by 10% in the machine and transverse directions at 200° C. to be heat-set, thereby manufacturing a bi-axially stretched film coated on both surfaces thereof and having a thickness of 188 μm. A dried coating thickness of the polyurethane coating layer was 80 nm, and a dried coating thickness of the antistatic coating layer was 60 nm.

Physical properties of the polyester film obtained as described above were shown in the following Table 1.

TABLE 1

|  | Antistatic coating layer surface resistance (B) (Ω/□) | | Good-adhesive coating layer surface resistance (A) (Ω/□) | | Difference in surface resistance (Ω/□) | Transfer performance | Light transmittance (%) | Adhesive force | Blocking property |
| --- | --- | --- | --- | --- | --- | --- | --- | --- | --- |
|  | Before back-side transfer | After back-side transfer | Before back-side transfer | After back-side transfer |  |  |  |  |  |
| Example (1) | $5 \times 10^{10}$ | $5 \times 10^{10}$ | $1 \times 10^{13}$ or more | $1 \times 10^{13}$ or more | $10^4$ or more | ○ | 92.0 | Grade 5 | ○ |
| Example (2) | $2 \times 10^{9}$ | $2 \times 10^{9}$ | $1 \times 10^{13}$ or more | $1 \times 10^{13}$ or more | $10^4$ or more | ○ | 92.0 | Grade 5 | ○ |
| Example (3) | $1 \times 10^{8}$ | $4 \times 10^{8}$ | $1 \times 10^{13}$ or more | $1 \times 10^{13}$ or more | $10^4$ or more | ○ | 92.0 | Grade 5 | ○ |
| Comparative Example (1) | $5 \times 10^{8}$ | $8 \times 10^{9}$ | $1 \times 10^{13}$ or more | $2 \times 10^{10}$ | $10^0$~$10^1$ | X | 92.5 | Grade 4 | ○ |
| Comparative Example (2) | $3 \times 10^{8}$ | $3 \times 10^{9}$ | $1 \times 10^{13}$ or more | $6 \times 10^{10}$ | $10^1$~$10^2$ | X | 92.5 | Grade 4 | ○ |

In Table 1, at the time of measuring the surface resistance of the good-adhesive coating layer, both of the surface resistance values measured before and after back-side transfer were $1 \times 10^{13}$ or more. At the time of measuring the surface resistance using the Hiresta-Up product (Mitsubishi Chemical, Japan), maximally, the surface resistance of $1 \times 10^{13}$ (based on 500V) may be measured. Therefore, it was judged that the surface resistance before back-side transfer was similar to $1 \times 10^{16}$, which was a surface resistance value of the polyester film, that is, the base film, and the difference in surface resistance value after back-side transfer was or $10^4$ or more.

As shown in Table 1, in the polyester film product manufactured using the anionic or cationic antistatic agent, physical properties with respect to coating appearance, surface resistance, and light transmittance may be easily secured. However, it was confirmed that in the case of Comparative Examples 1 and 2 in which the antistatic agent having a low molecular weight (molecular weight 2,000 to 3,000) was used, the antistatic agent was transferred to the rear surface, thereby deteriorating the adhesive force of the good-adhesive coating layer on the rear surface.

Therefore, it may be confirmed from the results shown in Table 1 that in the polyester film according to the present invention, the light transmittance was excellent (92% or more), the surface resistance of the antistatic coating layer was about $10^9$~$10^{10}$Ω/□, which means excellent antistatic performance, and all of the adhesive force of the good-adhesive layer, the blocking properties of the good-adhesive layer and the antistatic layer, and transfer performance of the antistatic agent were excellent.

The present invention described above is not limited to the above-mentioned Examples, but may be variously substituted, altered, and modified by those skilled in the art to which the present invention pertains without departing from the scope and spirit of the present invention.

DETAILED DESCRIPTION OF MAIN ELEMENTS

10: polyester base film
20: good-adhesive coating layer
30: antistatic coating layer

The invention claimed is:

1. A polyester laminated film comprising:
a polyester base film;
an good-adhesive coating layer formed on one surface of the base film; and
an antistatic coating layer formed on the other surface of the base film,
wherein after back-side transfer is performed on the antistatic coating layer and the good-adhesive coating layer at 40° C. for 3 days under a load of 50 kgf/cm², surface resistance A of the good-adhesive coating layer and surface resistance B of the antistatic coating layer satisfy the following Equation 1:

$$1 \times 10^4 \leq A - B.$$

in which A indicates the surface resistance (Ω/□) of the good-adhesive coating layer after back-side transfer, and B indicates the surface resistance (Ω/□) of the antistatic coating layer after back-side transfer.

2. The polyester laminated film of claim 1, wherein the surface resistance of the good-adhesive coating layer before back-side transfer is $1 \times 10^{13}$ to $1 \times 10^{16}$Ω/□.

3. The polyester laminated film of claim 1, wherein the surface resistance of the antistatic coating layer before back-side transfer is $1 \times 10^9$ to $1 \times 10^{10}$Ω/□.

4. The polyester laminated film of claim 1, wherein the base film has a thickness of 100 to 250 μm, the good-adhesive coating layer has a dried coating thickness of 50 to 100 nm, and the antistatic coating layer has a dried coating thickness of 0.03 to 0.1 μm.

5. The polyester laminated film of claim 1, wherein the good-adhesive coating layer is formed by applying a polyurethane coating composition containing a water dispersion polyurethane resin containing isocyanate terminal groups partially or entirely blocked by an inorganic acid salt.

6. The polyester laminated film of claim 5, wherein the polyurethane coating composition contains 5 to 10 weight % of a water dispersion polyurethane binder containing the water dispersion polyurethane resin and water and having a solid content of 10 to 30 weight %, 0.1 to 0.5 weight % of silicone-based wetting agent, 0.1 to 0.5 weight % of colloidal silica particle, and residual water.

7. The polyester laminated film of claim 5, wherein the water dispersion polyurethane resin is composed of 10 to 75 weight % of a linear polymer and 25 to 90 weight % of a branched polymer.

8. The polyester laminated film of claim 5, wherein the water dispersion polyurethane resin is prepared by reacting 39 to 45 weight % of polyol, 0.3 to 1.2 weight % trimethylol propane, and 50 to 57 weight % of an isocyanate compound to each other to prepare a pre-polymer having an isocyanate terminal group and again reacting the pre-polymer with 3 to 4 weight % of an inorganic acid salt to block the isocyanate terminal group with ionic groups.

9. The polyester laminated film of claim 8, wherein the water dispersion polyurethane resin has a weight average molecular weight of 10,000 to 20,000.

10. The polyester laminated film of claim 1, wherein the antistatic coating layer is formed by applying an antistatic coating composition containing a binder resin and a quaternary ammonium sulfonate-based compound.

11. The polyester laminated film of claim 10, wherein the antistatic coating layer contains the quaternary ammonium sulfonate-based compound at a content of 30 to 300 parts by weight based on 100 parts by weight of the binder resin and has the entire solid content of 5 to 10 weight %.

12. The polyester laminated film of claim 10, wherein the binder resin is an acrylic resin having a glass transition temperature of 50 to 80° C.

* * * * *